(12) United States Patent
Sharma et al.

(10) Patent No.: US 8,351,647 B2
(45) Date of Patent: Jan. 8, 2013

(54) AUTOMATIC DETECTION AND AGGREGATION OF DEMOGRAPHICS AND BEHAVIOR OF PEOPLE

(75) Inventors: Rajeev Sharma, State College, PA (US); Hankyu Moon, State College, PA (US); Namsoon Jung, State College, PA (US)

(73) Assignee: VideoMining Corporation, State College, PA (US)

( * ) Notice: Subject to any disclaimer, the term of this patent is extended or adjusted under 35 U.S.C. 154(b) by 954 days.

(21) Appl. No.: 12/002,398

(22) Filed: Dec. 17, 2007

(65) Prior Publication Data

US 2008/0109397 A1   May 8, 2008

Related U.S. Application Data

(63) Continuation-in-part of application No. 11/495,934, filed on Jul. 28, 2006, now abandoned, which is a continuation of application No. 10/448,850, filed on May 31, 2003, now abandoned.

(60) Provisional application No. 60/399,246, filed on Jul. 29, 2002.

(51) Int. Cl.
*G06K 9/00* (2006.01)
*G06Q 30/00* (2012.01)

(52) U.S. Cl. ..................................... 382/103; 705/14.49

(58) Field of Classification Search .................... 382/103
See application file for complete search history.

(56) References Cited

U.S. PATENT DOCUMENTS

| | | | |
|---|---|---|---|
| 5,369,571 A | 11/1994 | Metts | |
| 5,570,301 A * | 10/1996 | Barrus | 702/150 |
| 5,781,650 A | 7/1998 | Lobo et al. | |
| 5,966,696 A * | 10/1999 | Giraud | 705/14.41 |
| 6,188,777 B1 * | 2/2001 | Darrell et al. | 382/103 |
| 6,269,173 B1 * | 7/2001 | Hsien | 382/103 |
| 6,484,148 B1 * | 11/2002 | Boyd | 705/14.64 |
| 6,502,076 B1 * | 12/2002 | Smith | 705/14.54 |
| 6,504,546 B1 * | 1/2003 | Cosatto et al. | 345/473 |
| 7,006,982 B2 * | 2/2006 | Sorensen | 705/7.29 |
| 7,015,875 B2 * | 3/2006 | Wampler et al. | 345/2.1 |
| 7,120,279 B2 * | 10/2006 | Chen et al. | 382/118 |
| 7,174,029 B2 * | 2/2007 | Agostinelli et al. | 382/100 |
| 2001/0036298 A1 * | 11/2001 | Yamada et al. | 382/118 |
| 2002/0076100 A1 | 6/2002 | Luo | |
| 2002/0184098 A1 * | 12/2002 | Giraud et al. | 705/14 |
| 2005/0080671 A1 * | 4/2005 | Giraud et al. | 705/14 |
| 2007/0078706 A1 * | 4/2007 | Datta et al. | 705/14 |
| 2007/0110305 A1 * | 5/2007 | Corcoran et al. | 382/167 |

OTHER PUBLICATIONS

Michael J. Lyons, et al., "Automatic classification of single facial images," IEEE Transactions on Pattern Analysis and Machine Intelligence, Dec. 1999, vol. 21, No. 12.

(Continued)

*Primary Examiner* — David Zarka

(57) ABSTRACT

The present invention is a system and framework for automatically measuring and correlating visual characteristics of people and accumulating the data for the purpose of demographic and behavior analysis. The demographic and behavior characteristics of people are extracted from a sequence of images using techniques from computer vision. The demographic and behavior characteristics are combined with a timestamp and a location marker to provide a feature vector of a person at a particular time at a particular location. These feature vectors are then accumulated and aggregated automatically in order to generate a data set that can be statistically analyzed, data mined and/or queried.

8 Claims, 13 Drawing Sheets

OTHER PUBLICATIONS

Ismail Haritaoglu and Myron Flickner, "Attentive billboards," 11th International Conference on Image Analysis and Processing, Sep. 2001.

Baback Moghaddam and Ming-Hsuan Yang, "Gender classification with support vector machines," Proc. International Conference on Automatic Face and Gesture Recognition, 2000.

Mohammed Yeason and Yasuo Kuniyoshi, "Detecting and tracking human face and eye using an space-varying sensor and an active vision head," Proc. IEEE Conference on Computer Vision and Pattern Recognition, 2000, vol. 2, pp. 168-173.

Gregory Shakhnarovich, et al., A unified learning framework for real time face detection and classification, Proc. Fifth International Conference on Automatic Face and Gesture Recognition, May 20-21, 2002.

Srinivas Gutta, et al., "Gender and ethnic classification of face images," Proc. IEEE International Conference on Automatic Face and Gesture Recognition, 1998, pp. 194-199.

Young Ho Kwon and Niels Da Vitoria Lobo, "Age classification from facial images," Proc. IEEE Conference on Computer Vision and Pattern Recognition, 1994, pp. 762-767.

* cited by examiner

AUTOMATIC DETECTION AND AGGREGATION OF DEMOGRAPHICS AND BEHAVIOR OF PEOPLE

CROSS-REFERENCE TO RELATED APPLICATIONS

This patent application is a continuation in part of U.S. patent application Ser. No. 11/495,934, filed Jul. 28, 2006 now abandoned, which is a continuation application of U.S. patent application Ser. No. 10/448,850, filed May 31, 2003 now abandoned, which claims the benefit of U.S. Provisional Application No. 60/399,246, filed Jul. 29, 2002

FEDERALLY SPONSORED RESEARCH

Not Applicable

SEQUENCE LISTING OR PROGRAM

Not Applicable

BACKGROUND OF THE INVENTION

1. Field of the Invention

The present invention relates to the automatic measurement of visually perceptible attributes of the person or people within the range of visual sensor coverage.

2. Background of the Invention

Companies are constantly looking for new ways to improve their product or service. Companies spend millions of dollars each year in an effort to understand their customers and the effect of in store advertisements and product positioning on the buying habits of their customers. Until now, businesses have had to rely on spot surveys and ineffective frequent buyer programs to try to understand who their customers are and what their customers' behaviors are in their establishment.

The conventional approaches for gathering the demographic information, which require the customers' feedback and sales people's input, such as using questionnaires, registration forms or electronic devices, are often found to be cumbersome to both customers and sales people.

U.S. Pat. No. 5,369,571 of Metts disclosed a method and apparatus for obtaining demographic information at the point of sale. In the disclosed prior art, the sales clerk had to input an assessment concerning certain demographic information about the customer to generate the demographic data, using a bar code scanner, a keypad with keys, or buttons. However, this increases the sales clerk's labor load, and the extra activities delay overall processes at the point of sale, which could be costly from the business point of view of the particular businesses facility. Furthermore, the assessment could vary depending on the personal viewpoints of the sales clerks, thus making the accumulated demographic data from different sales clerks over a period of time unreliable.

Thus, these problems in the prior art require an automatic and efficient approach for gathering the demographic information from the customers.

Computer vision algorithms have been shown to be an effective means for detecting people. For example, in Haritaoglu, Ismail and Flickner, Myron, "Attentive Billboards", 2001 IEEE, pp. 162-167, the authors describe a method for detecting people and determining how long those people looked at a billboard. Also, in U.S. Pat. Application. No. 20020076100, the authors describe a method for detecting human figures in a digital image.

Other computer vision techniques have been shown to be able to extract relevant demographic features of people in an image. For example, in Moghaddam, Baback and Yang, Ming-Hsuan, "Gender Classification with Support Vector Machines", 2000 Proc. of Int'l Conf. on Automatic Face and Gesture Recognition, the authors describe a technique using Support Vector Machines (SVM) for classifying a face image as a male or female person. In the U.S. Pat. No. 5,781,650, the authors describe a method for discerning the age of a person in an image. In Lyons, Michael J. et al, "Automatic Classification of Single Facial Images", 1999 IEEE Transactions on Pattern Analysis and Machine Intelligence, vol. 21, no. 12, pp. 1357-1362, the authors describe a method for discerning the ethnicity (or race) of a person in an image. Finally, in U.S. Pat. No. 6,188,777, the authors describe a means to extract a person's height, skin color, and clothing color from an image of a person. The combination of computer vision techniques such as the ones mentioned above allows for the possibility of connecting the visual information from a scene with a timestamp and a location marker to derive rich behavioral characteristics of the people in the scene and thus useful information.

SUMMARY

The objective of the present invention is to provide a system and framework for associating the automatically extracted demographic and behavior characteristics of people with a timestamp and a location marker to form a feature vector. These feature vectors are then accumulated and aggregated into a data set that can be statistically analyzed, data mined, and/or queried in order to discover trends of the people being viewed.

For example, it may be desirable to determine what the demographic make-up of the people who shop in a store on Mondays is. In this example, the normal way that this is done is to manually collect the demographic data of the people who shop in a store on Mondays. This invention provides a process and framework for collecting such data automatically.

The components of the system are the following: Visual Sensing Device(s) (VSD), Demographic Feature Extractor (DFE), and the Data Repository (DR).

Examples of a VSD are a monocular camera, stereo camera, or infrared camera. Please note that this invention is not limited to the example visual sensing devices.

The DFE is composed of implementations of computer vision algorithms that extract the desired features of the people in the scene. Examples of desired features may include but are not limited to the following: gender, age, race, height, skin color, hair color, time in the field of view, time looking at an advertisement, etc. To facilitate an understanding of the invention, the particular features that will be included in the description are gender, age, race, and time in the field of view (FOV). However, the invention is not limited to these features. Rather, the invention is a framework for combining the visually extractable features and combining them with a timestamp and a location marker in order to form a time and location sensitive feature vector. The accumulation of these feature vectors provides a data set that before this invention required either written surveys or manual spot observations to generate.

In more general aspects, the VSD senses the people in its field of view. The digital images are then sent to the DFE for processing. For each person in an image the DFE forms a feature vector that includes, but is not limited to, the following items: The time the image was captured. The location of the VSD is stored when the VSD is installed. The gender, age, race, and the time in the field of view of each person are extracted from the image sequence. The feature vector is then stored in the data repository.

DRAWINGS-FIGURES

DETAILED DESCRIPTION OF THE INVENTION

Figure 1:
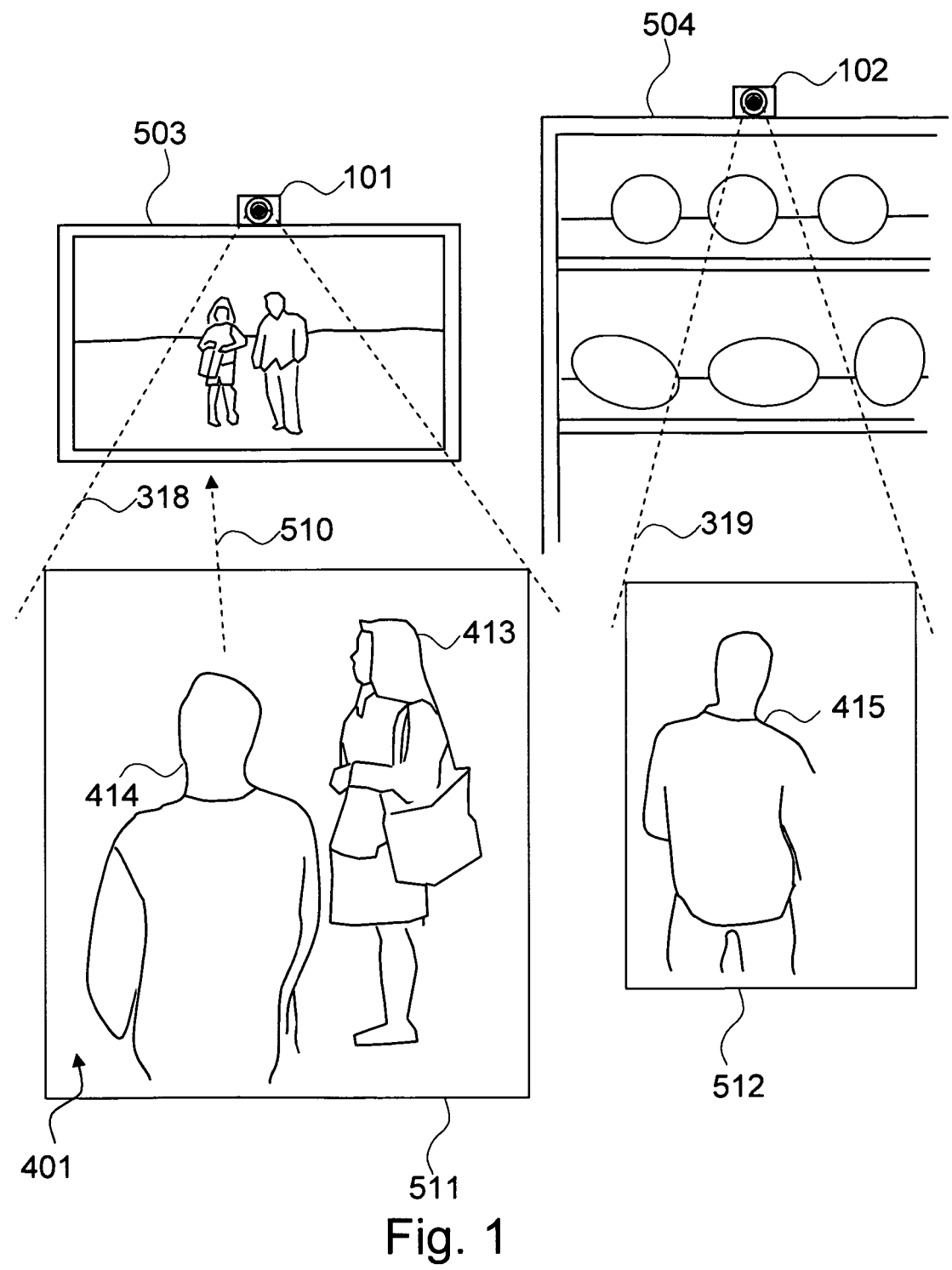
FIG. 1 shows an exemplary embodiment of the present invention under a typical scenario of operation.

The FIG. 1 shows an exemplary embodiment of the present invention under a typical scenario of operation. The present invention is a method and system for automatically measuring the behavior and demographic composition of people, by measuring the time stamp and the duration of presence of each person at a certain physical location, and classifying the demographics categories of the person. In the present invention, the behavior comprises the presence of people in certain location: entrance/exit time stamps, the duration, and the location marker. The demographics information can comprise the gender, age, ethnicity, height, skin color, or hair color of the person. The behavior information can be used to analyze the stopping power of an in-store fixture. For example, in an exemplary embodiment, any particular increase in the people count with an additional fixture indicates the stopping power of the additional fixture. The behavior data combined with the demographics information of the customers can provide rich information to the areas such as marketing, merchandizing, digital media programming, etc.

In the exemplary embodiment as shown in FIG. 1, the present invention measures the behavior of the plurality of persons 401 without involving any hassle of feeding the information manually by the plurality of persons 401 or operator, or any hassle of carrying around a monitoring device, through the presented non-cumbersome method based on computer vision technology. The first means for capturing images 101 can be used to measure the presence of the person 1 413 and the person 2 414, at location 1 511 near the fixture 1 503, and the demographics information of the person 1 413 and of the person 2 414, once they enter the field of view 1 318 of the first means for capturing device 101. The second means for capturing images 102 can be used to measure the presence 2 of the person 3 415 at location 2 512 near the fixture 2 504, and the demographics information of the person 3 415, once the person enter the field of view 1 319 of the second means for capturing device 102. The behavior and demographics information of each person comprises a feature vector, and the collected data comprising such vectors can be analyzed further for many applications. In the exemplary embodiment, the first means for capturing images 101 can also be used to measure the viewership 510 to the fixture 1 503 of the person 2 414.

In the exemplary embodiment, a fixture, such as a poster advertisement, or an end-cap, or a digital sign can display an advertisement that the owners of the fixture want to measure the demographics of the people who look at the advertisement. In this embodiment, a Visual Sensing Device is mounted so the viewing angle captures people as they look at the fixture. This embodiment will allow the owner of the fixture to measure the demographic make-up of the people who are looking at the advertisement displayed on the fixture. This information can then be used to, in the case of a digital sign, display targeted advertisements for the demographics that are currently looking at the fixture. This information can also be used to measure how effective an advertisement is with different demographics.

Figure 2:
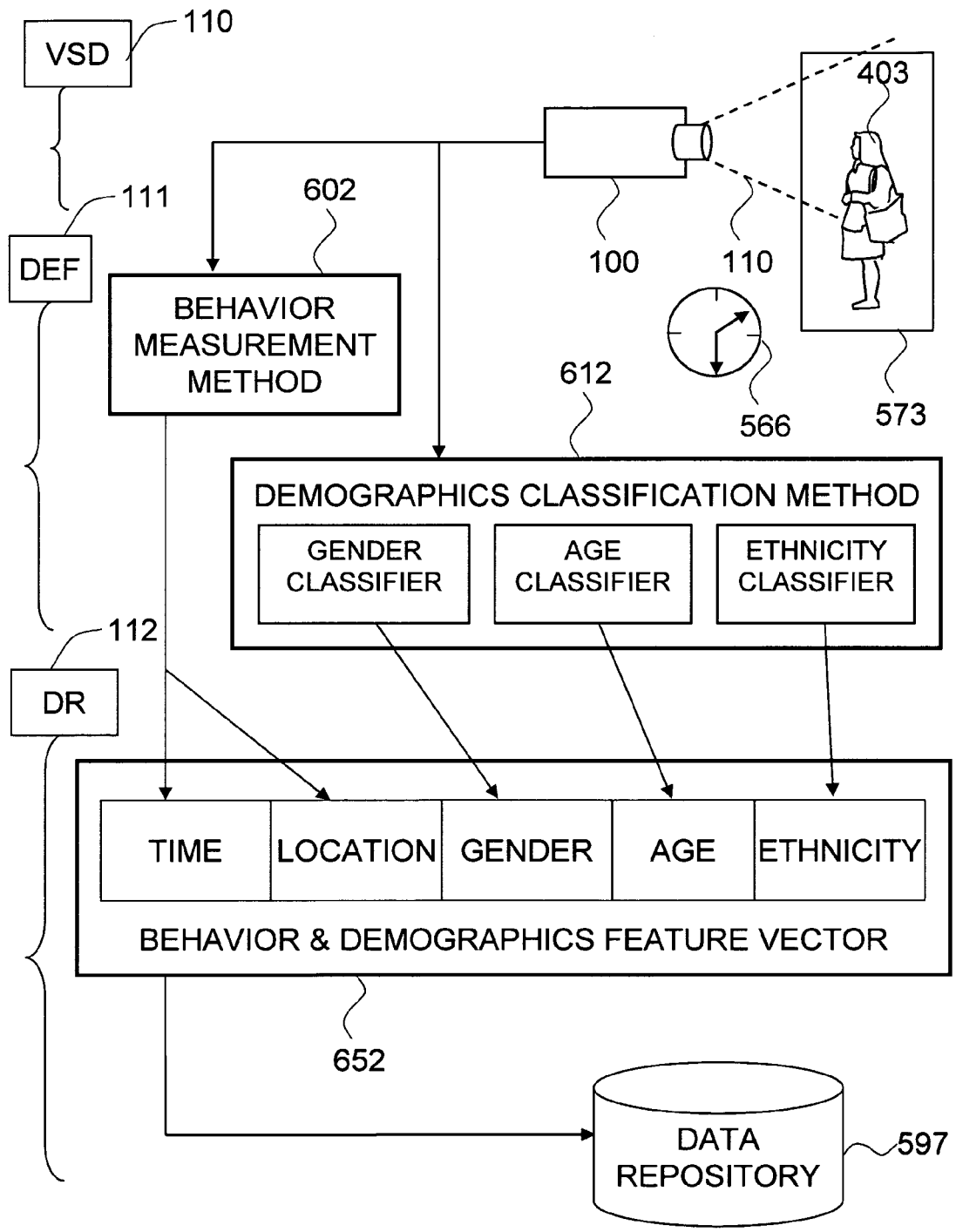
FIG. 2 shows an overview of an exemplary embodiment of the present invention.

The FIG. 2 shows an overview of an exemplary embodiment of the present invention. The present invention is directed at providing a system and framework for associating the automatically extracted behavior and demographic characteristics of people with a timestamp and a location marker to form a feature vector. These feature vectors are then accumulated and aggregated into a dataset that can be statistically analyzed, data mined, and/or queried in order to discover trends of the people visiting certain locations.

The present invention is not limited to a particular visual sensing device nor is it limited to the particular visually extracted features described. Rather this invention provides a framework which any set of visually extractable features are combined with a timestamp and a location marker to form a time sensitive and location sensitive feature vector that describes the person or people in the field of view of the visual sensing device. In addition, this invention describes the accumulation and aggregation of these feature vectors into a data set that can be statistically analyzed, data mined, and/or queried in order to discover trends of the people being viewed. One of the objectives of the invention is to replace the usual manual process of collecting the aforementioned data.

The components of the system are the following: Visual Sensing Device(s) (VSD) 110, Demographic Feature Extractor (DFE) 111, and the Data Repository (DR) 112.

VSD 110: When a person 403 enters the field of view (FOV) 110 of the means for capturing images 100. The means for capturing images 100 captures face images of the person in the FOV and sends them to the behavior measurement method 602 and the demographics classification method 612.

DFE 111: The behavior measurement method 602 detects the time 566 (start time and the end time) and the location 573 of the presence of the person 403, and records them to the behavior and demographics feature vector 652. The gender classifier, age classifier, and ethnicity classifier in demographics classification method 612 process the face image to find the gender, age, and ethnicity labels of the person.

DR 112: The gender, age, and ethnicity information is also recorded to the behavior and demographics feature vector 652. The set of behavior and demographics feature vectors 653 are then accumulated over a period of time and stored in the data repository 597.

Figure 3:
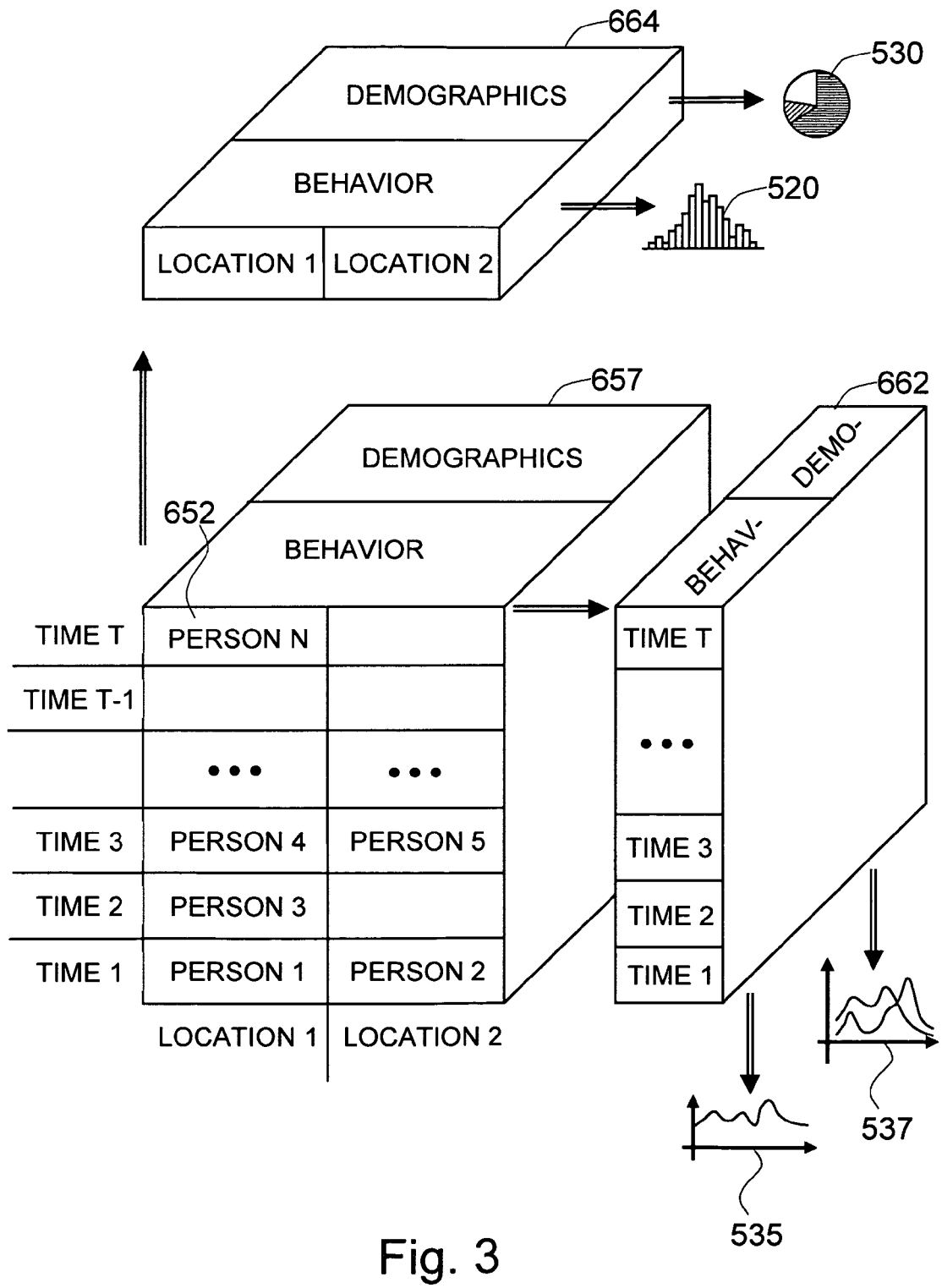
FIG. 3 shows an exemplary application of the present invention.

The FIG. 3 shows an exemplary application of the present invention, where the database of behavior and demographics feature vectors 657 can be manipulated to extract useful information. Conceptually, each behavior and demographics feature vector 652 resides in a multidimensional space, where each of the entrance time, exit time, spatial location, and demographics information constitutes a feature dimension. In the figure, the database of behavior and demographics feature vectors 657 (collected for person 1 through person N) is arranged according to the locations (location 1, location 2) and the time frames (time 1, time 2, time 3, . . . , time T). It is very straightforward to query the database to find useful information. For example, one can collect behavior data of certain demographics group at certain time. Another example is where one can collect the temporal change of customer counts or average dwell time at certain physical location. It is also possible to collapse some dimensions to collect useful statistics. In the figure, the time dimension is collapsed to accumulate location specific data 664. The data can be further manipulated to collect statistics such as the location specific dwell time histogram 520, or the location specific demographics composition pie chart 530. On the other hand, the location (spatial) dimension can be collapsed to extract time specific data 662. The data can also be further manipulated to compute the time-varying customer counts 535, or the time-varying customer counts for demographics groups 537.

Example Preferred Embodiments

A preferred embodiment of this invention is a system and framework for combining a timestamp and a location marker with automatically extracted demographic and behavior features of people within the field of view of the visual sensing device. Further is the accumulation and aggregation of these features into a data set that allows for statistical analysis, data mining and/or querying for the purpose of discovering behavior patterns of groups of people and trends of the sensed people.

In an exemplary embodiment, a data set can be generated by the following queries based on a digitized interval (e.g. hour, day, week, month or year) of the collected timestamp. The following list is an exemplary list of queries using a digitized interval of the timestamp.

a) Show the average number of people per hour.
 i) Broken down by Gender.
 ii) Broken down by Age Groups.
 iii) Broken down by Ethnicity Groups.
 iv) Broken down by Gender and Age Groups.
 v) Broken down by Gender and Ethnicity Groups.
 vi) Broken down by Age Groups and Ethnicity Groups.
 vii) Broken down by Gender, Age Groups, and Ethnicity Groups.
b) Show the standard deviation of people per hour.
 i) Broken down by Gender.
 ii) Broken down by Age Groups.
 iii) Broken down by Ethnicity Groups.
 iv) Broken down by Gender and Age Groups.
 v) Broken down by Gender and Ethnicity Groups.
 vi) Broken down by Age Groups and Ethnicity Groups.
 vii) Broken down by Gender, Age Groups, and Ethnicity Groups.
c) Show the total number of people per hour.
 i) Broken down by Gender.
 ii) Broken down by Age Groups.
 iii) Broken down by Ethnicity Groups.
 iv) Broken down by Gender and Age Groups.
 v) Broken down by Gender and Ethnicity Groups.
 vi) Broken down by Age Groups and Ethnicity Groups.
 vii) Broken down by Gender, Age Groups, and Ethnicity Groups.
d) Show the average time people spent in the field of view per hour.
 i) Broken down by Gender.
 ii) Broken down by Age Groups.
 iii) Broken down by Ethnicity Groups.
 iv) Broken down by Gender and Age Groups.
 v) Broken down by Gender and Ethnicity Groups.
 vi) Broken down by Age Groups and Ethnicity Groups.
 vii) Broken down by Gender, Age Groups, and Ethnicity Groups.
e) Show the standard deviation of time people spent in the field of view per hour.
 i) Broken down by Gender.
 ii) Broken down by Age Groups.
 iii) Broken down by Ethnicity Groups.
 iv) Broken down by Gender and Age Groups.
 v) Broken down by Gender and Ethnicity Groups.
 vi) Broken down by Age Groups and Ethnicity Groups.
 vii) Broken down by Gender, Age Groups, and Ethnicity Groups.

In an exemplary embodiment, a data set can be generated by the following queries based on the actual location marker or an aggregate of the location. The location marker can be a marker that represents the actual address of the store in question. Aggregation can occur based on such things as zip code, city, state, region, and/or country. The following list is an exemplary list of queries using the location marker:

a) Show the average number of people per store location.
 i) Broken down by Gender.
 ii) Broken down by Age Groups.
 iii) Broken down by Ethnicity Groups.
 iv) Broken down by Gender and Age Groups.
 v) Broken down by Gender and Ethnicity Groups.
 vi) Broken down by Age Groups and Ethnicity Groups.
 vii) Broken down by Gender, Age Groups, and Ethnicity Groups.
b) Show the standard deviation of people per store location.
 i) Broken down by Gender.
 ii) Broken down by Age Groups.
 iii) Broken down by Ethnicity Groups.
 iv) Broken down by Gender and Age Groups.
 v) Broken down by Gender and Ethnicity Groups.
 vi) Broken down by Age Groups and Ethnicity Groups.
 vii) Broken down by Gender, Age Groups, and Ethnicity Groups.
c) Show the total number of people per store location.
 i) Broken down by Gender.
 ii) Broken down by Age Groups.
 iii) Broken down by Ethnicity Groups.
 iv) Broken down by Gender and Age Groups.
 v) Broken down by Gender and Ethnicity Groups.
 vi) Broken down by Age Groups and Ethnicity Groups.
 vii) Broken down by Gender, Age Groups, and Ethnicity Groups.
d) Show the average time people spent in the field of view per store location.
 i) Broken down by Gender.
 ii) Broken down by Age Groups.
 iii) Broken down by Ethnicity Groups.
 iv) Broken down by Gender and Age Groups.
 v) Broken down by Gender and Ethnicity Groups.

vi) Broken down by Age Groups and Ethnicity Groups.
vii) Broken down by Gender, Age Groups, and Ethnicity Groups.
e) Show the standard deviation of time people spent in the field of view per store location.
  i) Broken down by Gender.
  ii) Broken down by Age Groups.
  iii) Broken down by Ethnicity Groups.
  iv) Broken down by Gender and Age Groups.
  v) Broken down by Gender and Ethnicity Groups.
  vi) Broken down by Age Groups and Ethnicity Groups.
  vii) Broken down by Gender, Age Groups, and Ethnicity Groups.

In an exemplary embodiment, a data set can be generated by the following queries based on the combination of the timestamp and location marker. The following list is an exemplary list of queries combining the timestamp and location marker:

a) Show the average number of people per day per store location.
  i) Broken down by Gender.
  ii) Broken down by Age Groups.
  iii) Broken down by Ethnicity Groups.
  iv) Broken down by Gender and Age Groups.
  v) Broken down by Gender and Ethnicity Groups.
  vi) Broken down by Age Groups and Ethnicity Groups.
  vii) Broken down by Gender, Age Groups, and Ethnicity Groups.
b) Show the standard deviation of people per day per store location.
  i) Broken down by Gender.
  ii) Broken down by Age Groups.
  iii) Broken down by Ethnicity Groups.
  iv) Broken down by Gender and Age Groups.
  v) Broken down by Gender and Ethnicity Groups.
  vi) Broken down by Age Groups and Ethnicity Groups.
  vii) Broken down by Gender, Age Groups, and Ethnicity Groups.
c) Show the total number of people per day per store location.
  i) Broken down by Gender.
  ii) Broken down by Age Groups.
  iii) Broken down by Ethnicity Groups.
  iv) Broken down by Gender and Age Groups.
  v) Broken down by Gender and Ethnicity Groups.
  vi) Broken down by Age Groups and Ethnicity Groups.
  vii) Broken down by Gender, Age Groups, and Ethnicity Groups.
d) Show the average time people spent in the field of view per day per store location.
  i) Broken down by Gender.
  ii) Broken down by Age Groups.
  iii) Broken down by Ethnicity Groups.
  iv) Broken down by Gender and Age Groups.
  v) Broken down by Gender and Ethnicity Groups.
  vi) Broken down by Age Groups and Ethnicity Groups.
  vii) Broken down by Gender, Age Groups, and Ethnicity Groups.
e) Show the standard deviation of time people spent in the field of view per day per store location.
  i) Broken down by Gender.
  ii) Broken down by Age Groups.
  iii) Broken down by Ethnicity Groups.
  iv) Broken down by Gender and Age Groups.
  v) Broken down by Gender and Ethnicity Groups.
  vi) Broken down by Age Groups and Ethnicity Groups.
  vii) Broken down by Gender, Age Groups, and Ethnicity Groups.

Figure 4:
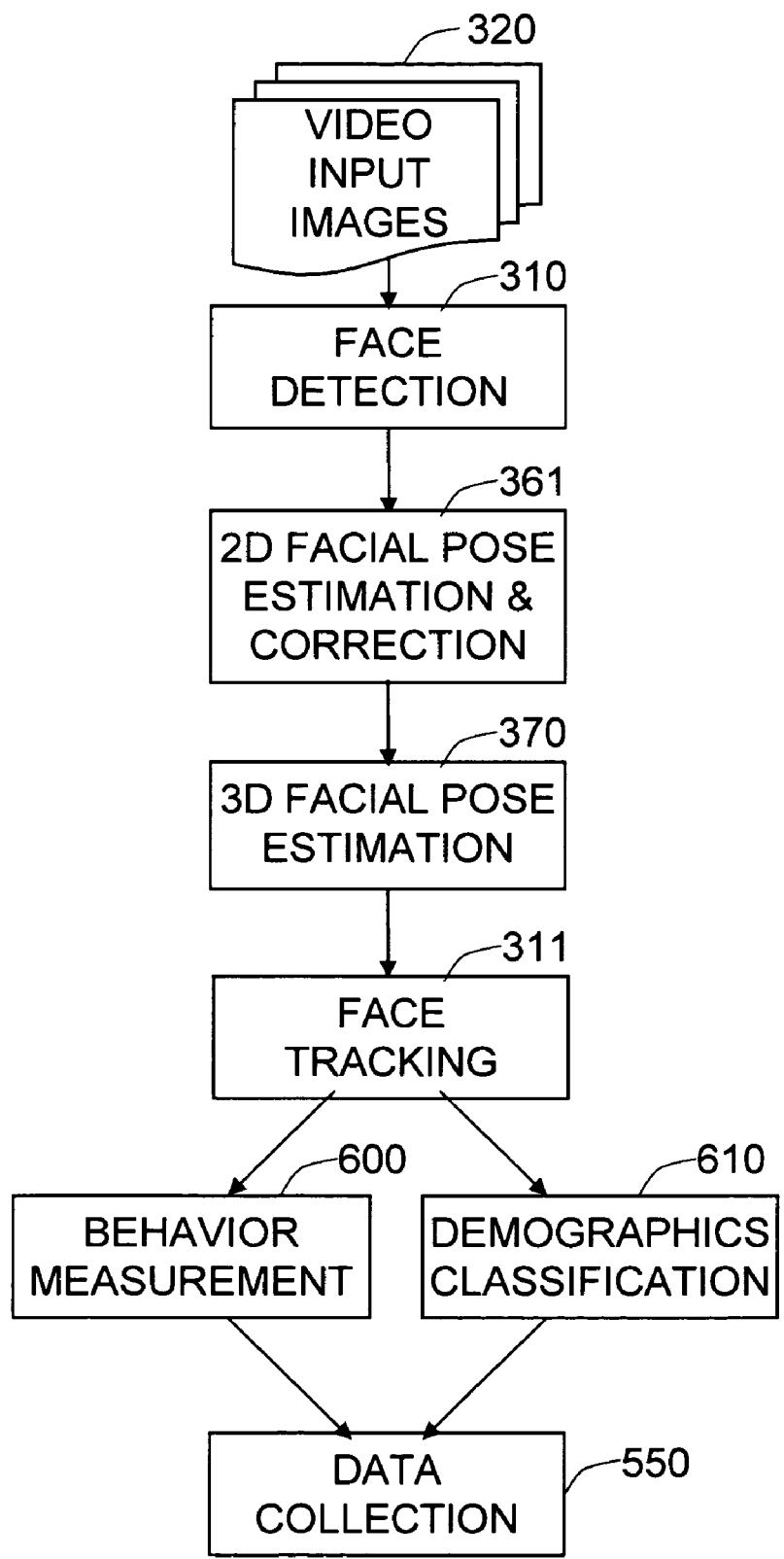
FIG. 4 shows an overview of behavior and demographics measurement processes in an exemplary embodiment of the present invention.

The FIG. 4 shows an overview of behavior and demographics measurement processes in an exemplary embodiment of the present invention. In the exemplary embodiment, the system aims to automatically assess the behavior near the fixture, by processing the video input images 320 from a means for capturing images 100, such as the first means for capturing images 101, located nearby the fixture. The system takes live video as an input and detects 310 people's faces in the video. The detected faces vary in position, size, and orientation in the detection window; the variation is corrected by the 2D facial pose estimation and correction 361 step. The 3D facial pose is also estimated 370 to measure the attentiveness of the customer to a certain fixture. The faces are individually tracked 311 by keeping identities. The order of the 3D pose estimation 370 and the tracking 311 can be interchanged. After tracking a person, behavior measurement 600 is performed; the time stamps (the entrance time and the exit time) are determined. The demographics classification 610 is also performed after the tracking, determining the gender, age, and ethnicity labels of the tracked person. Both the behavior data and the demographics data of the person is recorded as a behavior & demographics feature vector 652 and stored in data collection 550 step.

Figure 5:
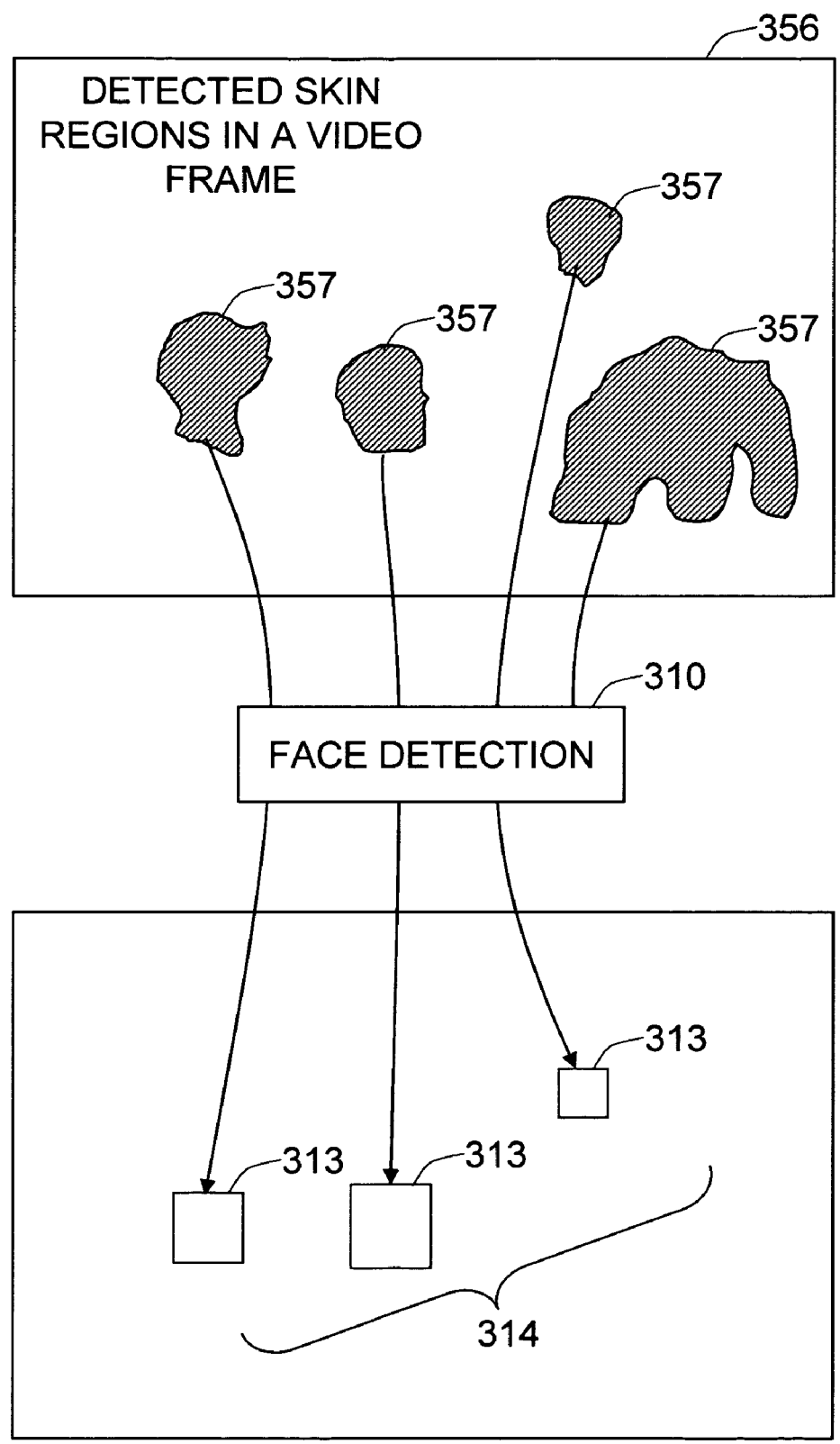
FIG. 5 shows an exemplary face detection process in an exemplary embodiment.

The FIG. 5 shows an exemplary face detection 310 process in an exemplary embodiment. In the exemplary embodiment, the present invention first processes the skin tone segmentation 356. At the skin tone detection 356 step, the module finds skin region 357 in the video frame. The scheme utilizes a color space transformation, so that the skin tone forms a compact region in the transformed space. The skin tone detection 356 serves as a means to speed up the face detection 310, which is a major bottleneck in face processing. The skin tone detection also significantly reduces falsely detected faces from the background; this feature is especially beneficial when the system needs to detect human faces against the complex background present in typical public scenes. The output from this step is a collection of masked regions in the video frame.

Next, a face detection 310 process follows. A machine learning-based approach is employed to detect faces within the skin tone region 357 determined by the previous step. This step operates on an image converted to gray scale to detect faces. The step provides the system with face windows 314 that encode both the locations and sizes of detected faces in the given video frame.

Figure 6:
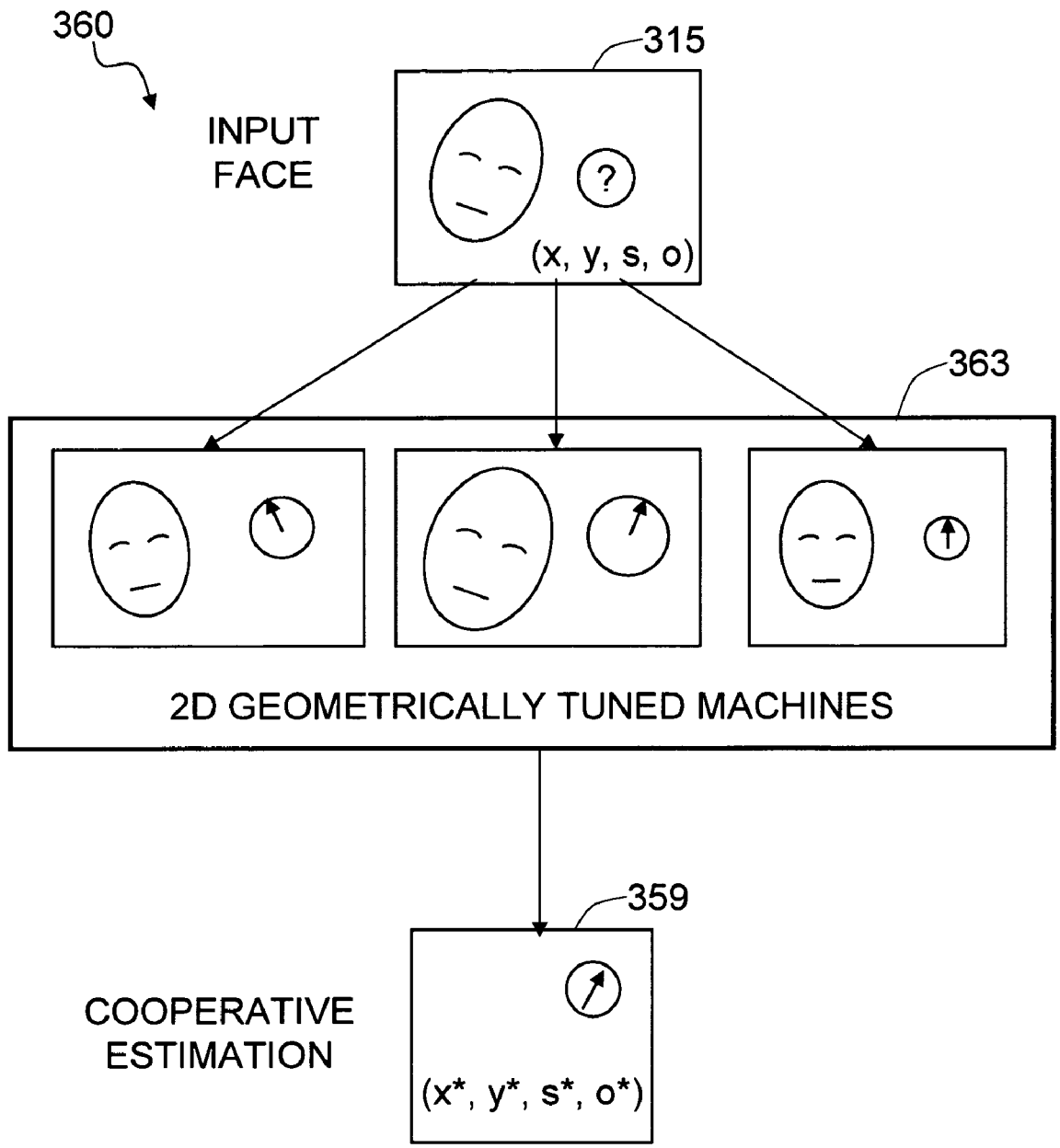
FIG. 6 shows a two-dimensional facial pose estimation scheme in an exemplary embodiment of the present invention.

The FIG. 6 shows a two-dimensional facial pose estimation scheme 360 in an exemplary embodiment of the present invention. This is a method to normalize the two-dimensional pose variation of the face detected from face detection 310. The output faces from a typical face detection method are varied in terms of the two-dimensional pose: position, size, and in-plane orientation. The normalization of these geometric attributes greatly benefits the subsequent face processing. The two-dimensional pose of the face is corrected so that the facial features across the face are aligned. The normalization of the facial image also benefits the subsequent three-dimensional facial pose estimation, because the problem of three-dimensional pose estimation becomes more manageable when the locations of the facial features are aligned.

The perturbation of the two-dimensional facial pose (x position, y position, size, in-plane orientation) of the detected face from the standard pose (0, 0, standard size, 0 in-plane orientation) is estimated to normalize the face. After these quantities are estimated, the face image is shifted, resized, and rotated to have the standard pose.

The estimation of facial pose (position_x, position_y, scale, orientation) is carried out by employing a parallel array of multiple learning machine regressors. Each machine has an inherent pose parameter (x, y, s, o). This architecture of employing specialized learning machines contributes to highly improved accuracy, because it is well known in the machine learning community that the learning machines do a more efficient estimation when they are given more limited (specialized) tasks.

After each machine is trained, the input face 315 is fed to each of the 2D pose tuned machines 363, and the pose (x*, y*, s*, o*) of the input face 315 is estimated by the cooperative estimation 359: the sum of the inherent parameters (x, y, s, o) of all the learning machines, each weighted by the likelihood L_I, estimated by each of the two-dimensional pose tuned machines 363:

$$(x^*,y^*,s^*,o^*)=\mathrm{SUM}\{i=1,\ldots,N\}L\_i^*(x\_i,y\_i,s\_i,o\_i) \quad (1)$$

Figure 7:
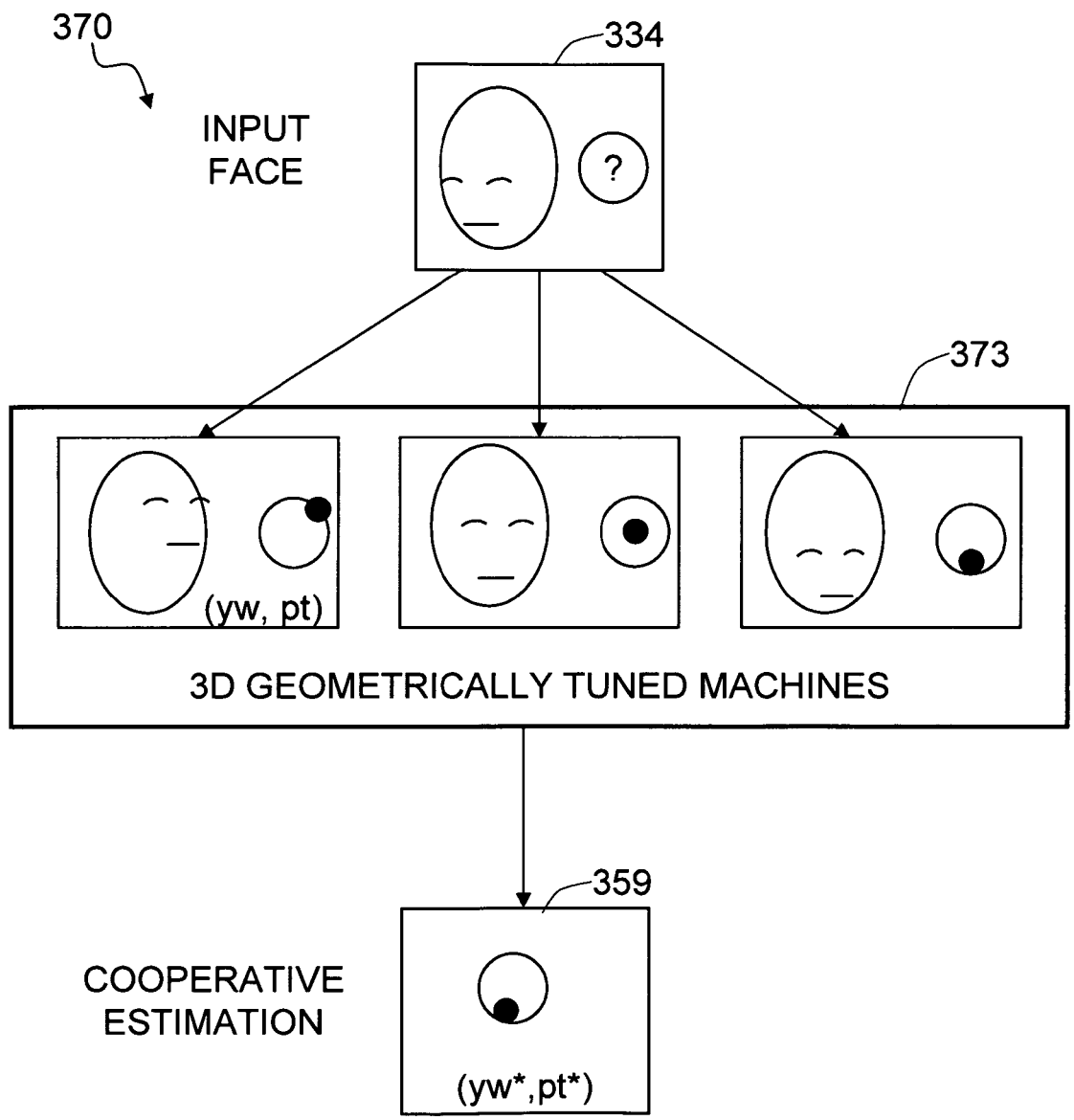
FIG. 7 shows a three-dimensional facial pose estimation scheme in an exemplary embodiment of the present invention.

FIG. 7 shows a three-dimensional facial pose estimation scheme 370 in an exemplary embodiment of the present invention.

This is a method to determine the three-dimensional pose (out-of-plane rotation) of the face detected from the face detection 310, and normalized by the 2D facial pose estimation & correction 360. The estimated 3D facial pose measures the attentiveness of the face, thereby providing useful behavior information. The estimation of the three-dimensional facial pose (yw, pt)=(yaw, pitch) is carried out by employing a parallel array of 3D pose tuned machines 373. Each machine has an inherent pose parameter (yw, pt). Given a corrected face 334, the machine is trained to estimate the likelihood of the face having the inherent pose. If the face has the pose (ywF, ptF), then the target output is the Gaussian likelihood: $L=\mathrm{Exp}(-(ywF-yw)/ky-(ptF-pt)/kp)$. ky, kp are constants that are determined empirically. This architecture of employing specialized learning machines contributes to highly improved accuracy, because it is well-known in the machine learning community that the machines do more efficient estimation when they are given more specific tasks.

After each machine is trained, a corrected face 334 is fed to each of the 3D pose tuned machines 373, and the pose (yw*, pt*) of the corrected face 334 is estimated by the cooperative estimation 359: the sum of the inherent parameters (yw*, pt*) of all the learning machines, each weighted by the estimated likelihood L_i of the given i-th pose, estimated by each of the 3D pose tuned machines 373:

$$(yw^*,pt^*)=\mathrm{SUM}\{i=1,\ldots,N\}L\_i^*(yw\_i,pt\_i) \quad (2)$$

Figure 8:
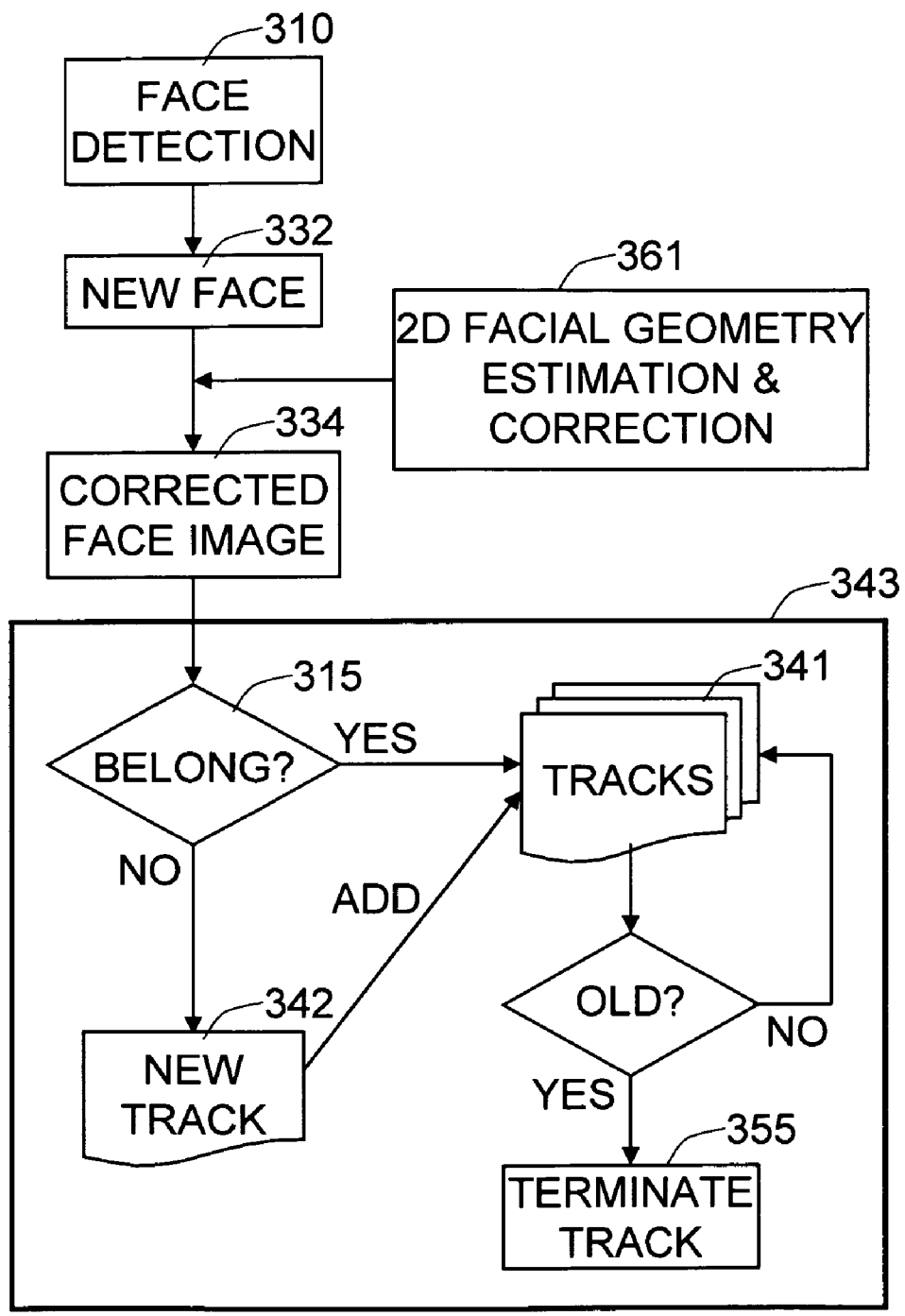
FIG. 8 shows an exemplary face tracking process in an exemplary embodiment, based on facial geometry estimation and appearance model building.
Figure 9:
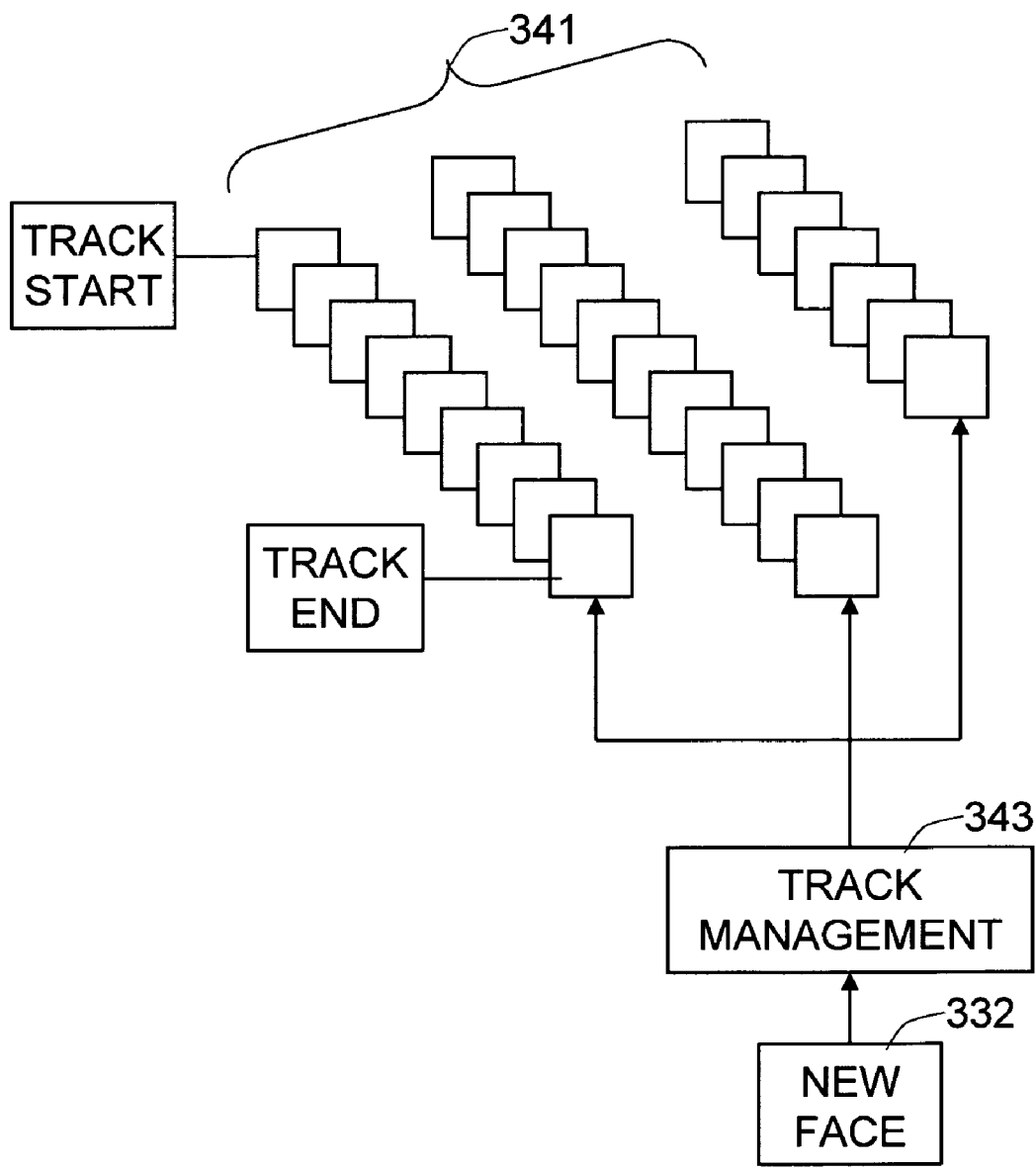
FIG. 9 shows an exemplary track management and verification of the face tracking process in an exemplary embodiment.

The FIG. 8 and FIG. 9 show an exemplary face tracking process in an exemplary embodiment. In the exemplary embodiment shown in FIG. 8, once a face is detected 310, it goes through the automatic 2D facial geometry estimation & correction 361 step. This step is necessary because the faces detected from the face detection 310 algorithm have some range of positional and size errors. The estimated facial geometry is used to generate the corrected face 334 from the detected face image 332 so that the facial features are placed on standard locations in the cropped face image chip. This step greatly helps to build a reliable facial appearance model across the track of a person, so that the given input face has a correct match to one of the accumulated models of the people present in the scene. Each time a face is added to a person track, the system builds the appearance model of the person by computing the pixel average image of the entire face image chips in the track.

The FIG. 8 and FIG. 9 also show an exemplary track management 343 and face track verification 315 of the face tracking process in an exemplary embodiment. In the exemplary embodiment of the present invention, the tracking step serves as a means to keep the identity of a person in the scene. The system then has a reliable measurement of time and duration of the person watching the fixtures, such as fixture 1 503 and fixture 2 504. The tracking utilizes two measurements: the geometric and appearance match between the track history and the newly detected face. The track management 343 serves as a means to generate 342 a track when a new face 332 appears in the scene, assign detected faces to tracks to keep identities of people, and to terminate 355 a track when the person is out of the scene.

When new faces are detected in the current video frame, the track management 343 constructs a table of faces and tracks 341. Then it computes the geometric match and appearance match scores of each (face, track) pair that measure the likelihood of the given face belonging to the given track.

The geometric match score is based on difference in the position, size, and the time between the corrected face 334 and the last face in the track.

The appearance match score measures the difference between the average face appearance stored in the track, and the corrected face 334. If the total score is below a predetermined threshold, the pair is excluded from the table. The pair having the highest score gets the assignment: from the face to the track. The procedure is repeated until all the faces are assigned matching tracks.

However, if there is a new person in the scene, the face is not supposed to have a match to existing tracks 341. In that case the threshold should have excluded the face, and the face should remain in the queue. The face then generates a new track 342, and the track is added to the list of tracks 341. For every frame, if a certain track didn't have a new face 332 for more than a pre-specified time period, the track management 343 terminates the track.

Figure 10:
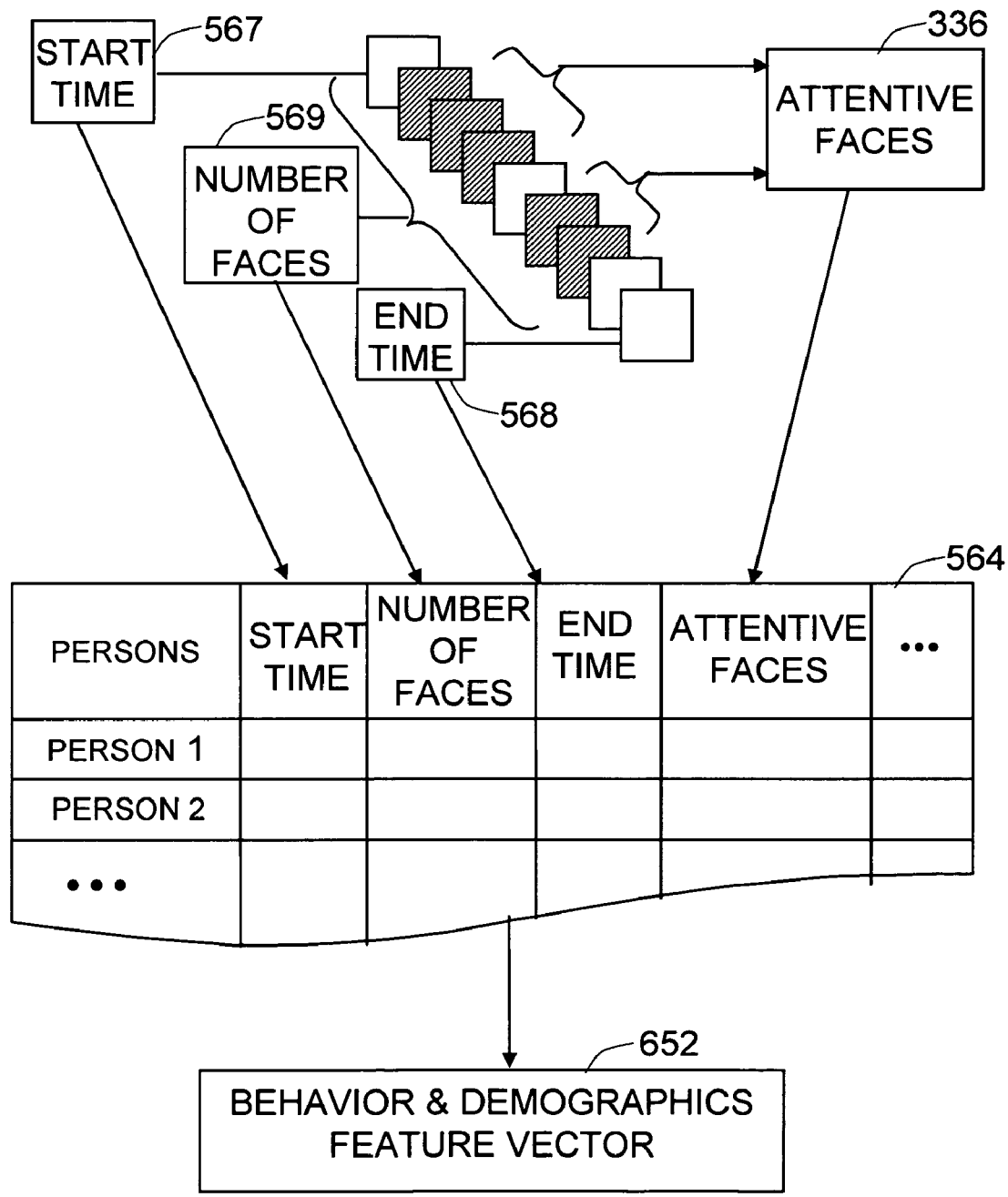
FIG. 10 shows a behavior data collection scheme in an exemplary embodiment of the present invention.

The FIG. 10 shows an exemplary behavior data collection in an exemplary embodiment of the present invention.

In the exemplary embodiment, a completed track can provide all the necessary information to assess the entrance time, exit time, and the duration of attention to a fixture. The start time 567 and the end time 568 of the track are recorded, and the difference between the two time stamps represents the total dwell time.

In an exemplary embodiment, the system has an added feature to accurately measure the degree of attention during the person's attention to a fixture by computing the proportion of the time when the person paid attention to the fixture 502 out of the total duration of the person's face. The face detection 310 step detects faces having a near-frontal pose, however, there are no guarantees that a person is actually looking at the fixture at the moment. The system utilizes a novel 3D facial pose estimation 370 to have a very good assessment of the behavior. The system can determine whether the face is truly frontal, based on the estimated facial orientation. Once the track is complete, the ratio of the number of frontal faces out of the number of the detected faces is computed.

The system can store the data as a table of the behavior data 564, where each track has fields of values: time stamps, the start time 567 and the end time 568 of the track for the appearance and disappearance of the face, the number of faces 569, and the number of attentive faces 336. The data is used to collect statistics, such as the histogram 520 of viewing, the number of persons as a function of time, etc. These data are stored as behavior data, as a part of the behavior and demographics feature vector 652.

Figure 11:
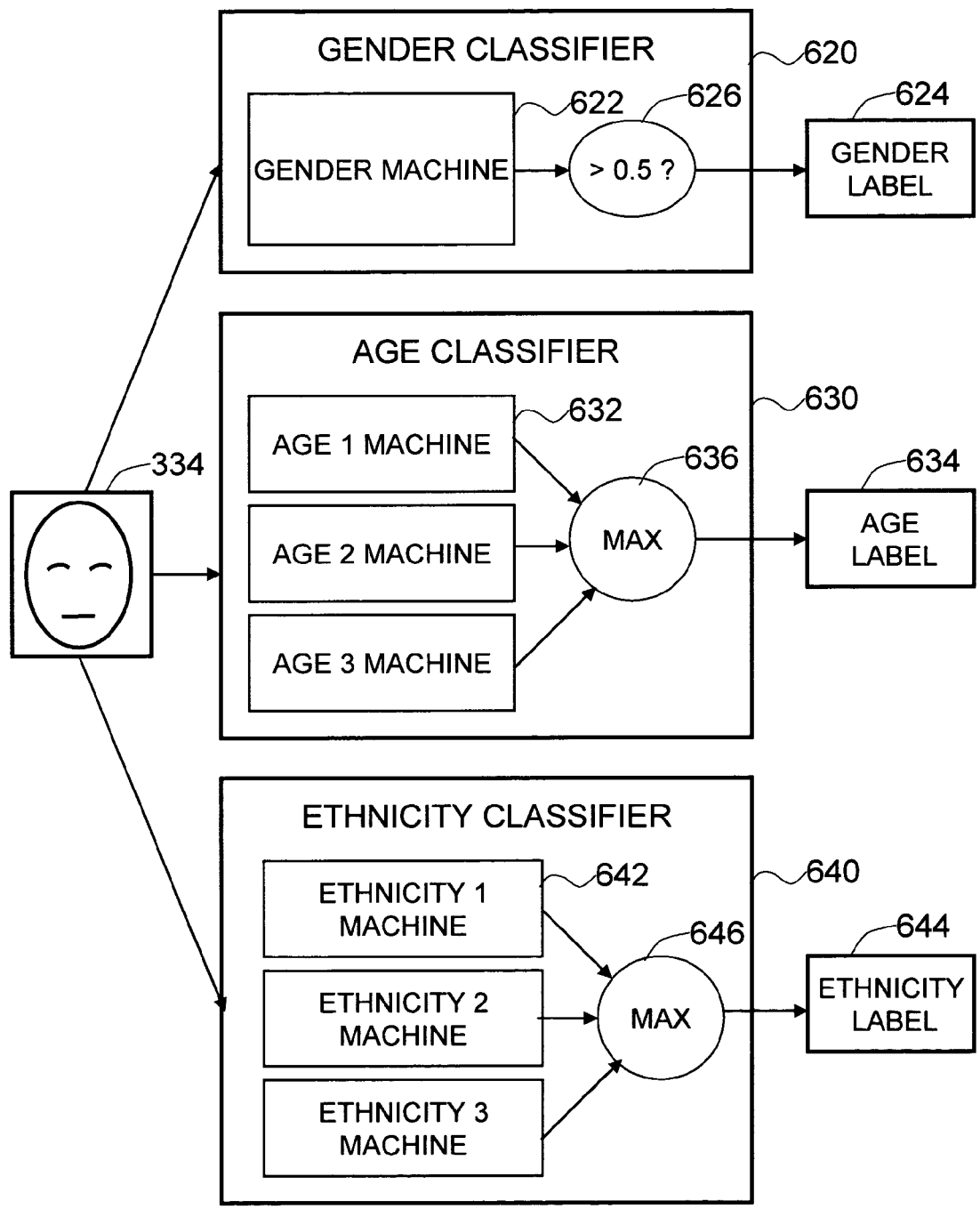
FIG. 11 shows an overview of the demographics measurement method in an exemplary embodiment of the present invention.

The FIG. 11 shows an overview of the demographics measurement method in an exemplary embodiment of the present invention. The demographics measurement method comprises of gender classifier 620, age classifier 630, and ethnicity classifier 640. The corrected face image 334 is fed to each of the classifiers. In this exemplary embodiment the gender classifier 620 comprises of gender machine 622 which outputs value close to 0 for female faces and value close to 1 for male faces. The thresholding by the value 0.5 determines 626 the gender label 624; if the output value is greater than 0.5 then the face is classified as male, otherwise the face is classified as female. The age classifier comprises of age 1 machine, age 2 machine, and age 3 machine, where each age machine 632 represents a specific age range. The age range that produces the maximum output among all the age machines is determined 636 as the age label 634 of the given face. The ethnicity classifier comprises of ethnicity 1 machine, ethnicity machine 2, and ethnicity machine 3, where each ethnicity machine 642 represents a specific ethnicity category. The ethnicity category that produces the maximum output among all the ethnicity machines is determined 646 as the ethnicity label 644 of the given face.

Figure 12:
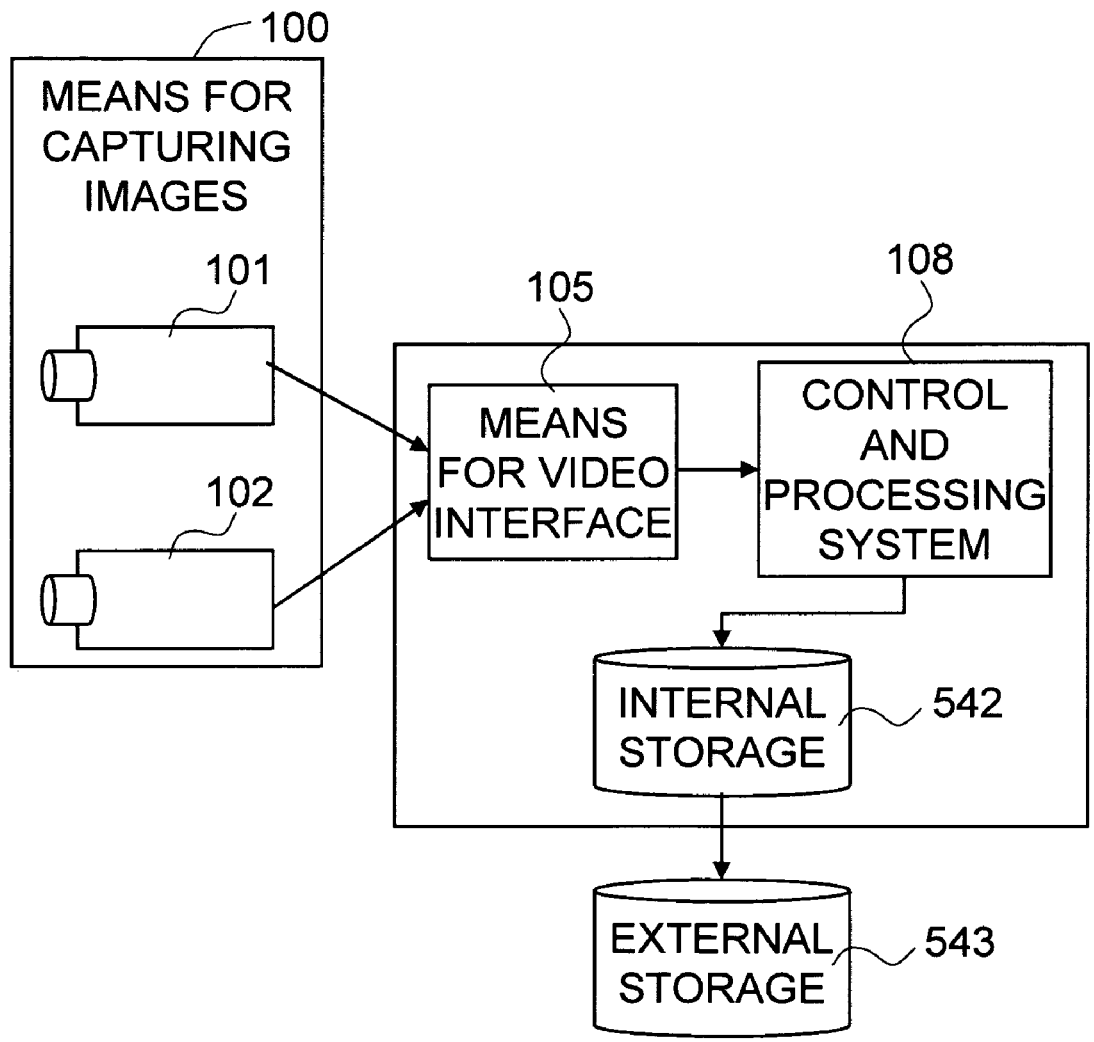
FIG. 12 shows exemplary hardware components in an exemplary embodiment of the present invention.

The FIG. 12 shows exemplary hardware components in an exemplary embodiment of the present invention. In an exemplary embodiment of the present invention, the means for capturing images 100 is connected to the means for video interface 105. In the exemplary embodiment shown in FIG. 12, a plurality of means for capturing images 100, the first means for capturing images 101 and the second means for capturing images 102 are connected to the means for video interface 105. The control and processing system 108 takes digitized video data from the means for video interface 105. The control and processing system 108 can have internal means for storing data 542 or external means for storing data 543.

The first means for capturing images 101 can be installed anywhere near the fixture 502, and they are connected to the means for video interface 105 through cables. The means for capturing images 100 can comprise an analog camera, USB camera, or Firewire camera. The means for video interface 105, which can comprise a video frame grabber, USB interface, or Firewire interface, are typically included in the same enclosure as the control and processing system 108. The control and processing system 108 can be a general-purpose personal computer, such as a Pentium 4 PC, or a dedicated hardware that can carry out the required computation. The control and processing system 108, as well as the means for video interface 105, can be placed locally or remotely, as long as the connection to the means for capturing images 100 can be established. The internal means for storing data 542, such as internal hard disks, is placed within the same enclosure as the control and processing system 108. The external means for storing data 543, such as network storage driver or internal hard disks contained in a remote computer, can be placed locally or remotely, as long as a means for transferring data is available.

In an exemplary embodiment, a general-purpose USB webcam can serve as the means for capturing images 100. A Pentium 4 2.8 GHz PC having 1 GB memory can serve as a control and processing system 108, where a generic USB interface included in the PC's motherboard can serve as a means for video interface 105. A generic IDE hard disk drive can serve as the internal means for storing data 542 or the external means for storing data 543.

Figure 13:
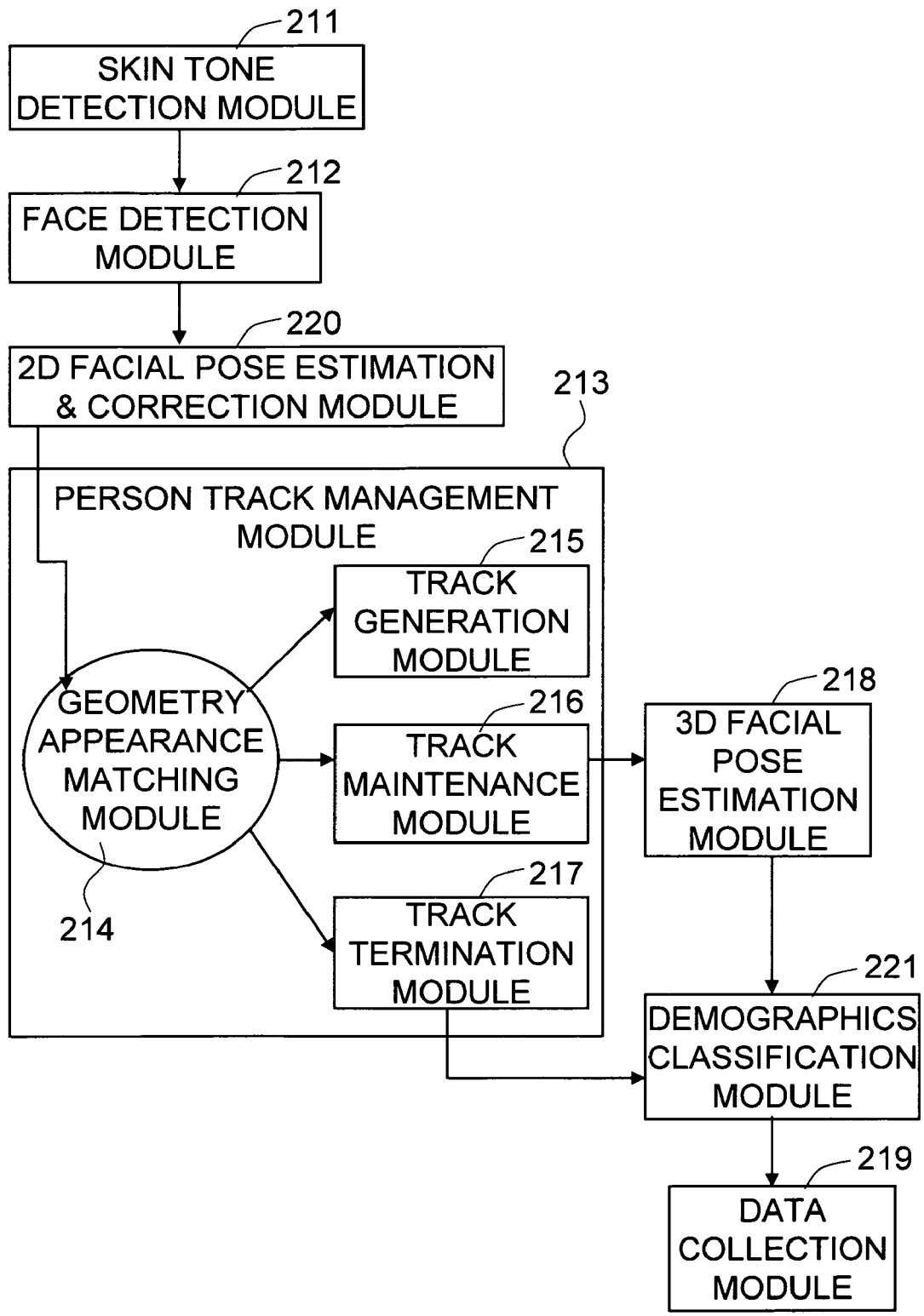
FIG. 13 shows exemplary software components in an exemplary embodiment of the present invention.

The FIG. 13 shows exemplary software components in an exemplary embodiment of the present invention. The software components comprise the skin tone detection module 211, face detection module 212, 2D facial pose estimation & correction module 220, person track management module 213, 3D facial pose estimation module 218, demographics classification module 221, and data collection module 219. The person track management module 213 further comprises geometry/appearance matching module 214, track generation module 215, track maintenance module 216, and track termination module 217.

The skin tone detection module 211 determines the region in the image frame that is similar to the facial skin tone. The face detection module 212 then runs the face detection window over the regions determined by the skin detection module 211. The detected faces are processed by the 2D facial pose estimation & correction module 220 to normalize the facial pose. The corrected faces are first processed by the geometry/appearance matching module 214 to determine if the faces belong to the existing tracks or if some of the faces are new, so that a new track can be generated. If the face is new, then the new track generation module 215 is activated to generate a new track and put it in the queue of tracks. If the face belongs to an existing track, then the track maintenance module 216 takes the track data, and activates the 3D facial pose estimation module 218. If the geometry/appearance matching module 214 cannot find subsequent faces that belong to some track, then the track termination module 217 is activated to store the track data and remove the track from the memory queue. At the termination, the face is fed to the demographics classification module 221 to find its demographics categories. The data collection module 219 then records the behavior data along with the demographics data.

The processing software component may be written in a high-level computer programming language, such as C++, and a compiler, such as Microsoft Visual C++, may be used for the compilation in the exemplary embodiment.

While the above description contains much specificity, these should not be construed as limitations on the scope of the invention, but as exemplifications of the presently preferred embodiments thereof. Many other ramifications and variations are possible within the teachings of the invention. Thus, the scope of the invention should be determined by the appended claims and their legal equivalents, and not by the examples given.

What is claimed is:

1. A method for detecting and aggregating demographics and behavior of people, comprising the following steps of:
   a) detecting the people from a plurality of input images in the vicinity of a fixture with at least a visual sensing device using a control and processing system,
   wherein the visual sensing device is connected to a means for video interface,
   b) detecting faces in the plurality of input images,
   c) detecting locations of facial features on the detected faces and estimating facial geometry including position, size, and orientation of the detected faces,
   d) aligning the detected faces using the facial geometry estimation,
   e) building appearance models of the people across image frames containing the detected faces, by averaging pixel values of the detected faces, aligned using estimates for the position, size, and orientation of the detected faces,
   wherein an estimation of the position, size, and orientation is carried out by employing a parallel array of multiple learning machine regressors,
   f) tracking the detected faces by keeping identities assigned to the detected faces,
   g) obtaining demographics information and behavior features of the people automatically, h) computing timestamps and location markers for the obtained demographics information and behavior features, and i) combining the obtained demographics information and behavior features with the timestamps and the location markers into a feature vector, wherein the behavior is detected based on an analysis of measurements for the behavior features, wherein the behavior features comprise timestamps, start time and end time of tracks for appearance and disappearance of the detected faces, duration of watching fixtures, counts of the detected faces, counts of attentive faces, viewership, location markers, and facial pose estimates, and wherein the demographics information comprises estimates of gender, age, and ethnicity of the people.

2. The method according to claim 1, wherein the method further comprises a step of estimating poses of the people by using a plurality of learning machines, each of which is specialized to a given pose range.

3. The method according to claim 1, wherein the method further comprises a step of managing face tracks to find a correct match between a history of face tracks and a new input face, using a geometric match score and an appearance match score, wherein the geometric match score measures a difference in position, size, and time between a corrected face and a last face in the face tracking, and wherein the appearance match score measures a difference between the corrected face and an average face appearance stored in the face tracking.

4. The method according to claim 1, wherein the method further comprises a step of automatically classifying demographics of the people based on demographics scores of the aligned faces, wherein two-dimensional poses of the detected faces are corrected so that the facial features across the detected faces are aligned.

5. An apparatus for detecting and aggregating demographics and behavior of people, comprising:

a) at least a control and processing system programmed to perform the following steps of:

detecting the people from a plurality of input images in the vicinity of a fixture with at least a visual sensing device, wherein the visual sensing device is connected to a means for video interface, detecting faces in the plurality of input images, detecting locations of facial features on the detected faces and estimating facial geometry including position, size, and orientation of the detected faces, aligning the detected faces using the facial geometry estimation, building appearance models of the people across image frames containing the detected faces, by averaging pixel values of the detected faces, aligned using estimates for the position, size, and orientation of the detected faces, wherein an estimation of the position, size, and orientation is carried out by employing a parallel array of multiple learning machine regressors, tracking the detected faces by keeping identities assigned to the detected faces, obtaining demographics information and behavior features of the people automatically, computing timestamps and location markers for the obtained demographics information and behavior features, and combining the obtained demographics information and behavior features with the timestamps and the location markers into a feature vector, and b) at least a means for storing data, wherein the behavior is detected based on an analysis of measurements for the behavior features, wherein the behavior features comprise timestamps, start time and end time of tracks for appearance and disappearance of the detected faces, duration of watching fixtures, counts of the detected faces, counts of attentive faces, viewership, location markers, and facial pose estimates, and wherein the demographics information comprises estimates of gender, age, and ethnicity of the people.

6. The apparatus according to claim 5, wherein the apparatus further comprises a control and processing system for estimating poses of the people by using a plurality of learning machines, each of which is specialized to a given pose range.

7. The apparatus according to claim 5, wherein the apparatus further comprises a control and processing system for managing face tracks to find a correct match between a history of face tracks and a new input face, using a geometric match score and an appearance match score, wherein the geometric match score measures a difference in position, size, and time between a corrected face and a last face in the face tracking, and wherein the appearance match score measures a difference between the corrected face and an average face appearance stored in the face tracking.

8. The apparatus according to claim 5, wherein the apparatus further comprises a control and processing system for automatically classifying demographics of the people based on demographics scores of the aligned faces, wherein two-dimensional poses of the detected faces are corrected so that the facial features across the detected faces are aligned.

* * * * *